(12) United States Patent
Murakami et al.

(10) Patent No.: US 9,331,993 B2
(45) Date of Patent: May 3, 2016

(54) AUTHENTICATION SERVER AND COMMUNICATION DEVICE

(75) Inventors: Shingo Murakami, Yokohama (JP); Ryoji Kato, Yokosuka (JP); Toshikane Oda, Tokyo (JP); Shinta Sugimoto, Nakamaruko (JP)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 189 days.

(21) Appl. No.: 14/114,759

(22) PCT Filed: Jun. 16, 2011

(86) PCT No.: PCT/SE2011/050759
§ 371 (c)(1),
(2), (4) Date: Oct. 30, 2013

(87) PCT Pub. No.: WO2012/173539
PCT Pub. Date: Dec. 20, 2012

(65) Prior Publication Data
US 2014/0075532 A1    Mar. 13, 2014

(51) Int. Cl.
*H04L 29/06*    (2006.01)
*H04W 12/06*    (2009.01)
*H04W 4/00*    (2009.01)

(52) U.S. Cl.
CPC .............. *H04L 63/08* (2013.01); *H04L 63/067* (2013.01); *H04L 63/0853* (2013.01); *H04W 12/06* (2013.01); *H04W 4/005* (2013.01)

(58) Field of Classification Search
CPC combination set(s) only.
See application file for complete search history.

(56) References Cited

U.S. PATENT DOCUMENTS 7,319,757 B2 *  1/2008  Kumar ..................... 380/247
8,527,759 B2 *  9/2013  Murakami et al. ........... 713/168
(Continued)

FOREIGN PATENT DOCUMENTS

EP          2222105 A1    8/2010
SE    WO2009/053818    * 10/2008
(Continued)

OTHER PUBLICATIONS

3rd Generation Partnership Project, "3rd Generation Partnership Project; Technical Specification Group Services and System Aspects; 3G Security; Security architecture (Release 10)", Technical specification, 3GPP TS 33.102 V 10.0.0, Dec. 1, 2010, pp. 1-71, 3GPP, France.

(Continued)

*Primary Examiner* — Peter Poltorak
(74) *Attorney, Agent, or Firm* — Patent Portfolio Builders, PLLC

(57) ABSTRACT

A communication device comprising a central processing unit (CPU) and a memory device is disclosed. The CPU is configured to send a first attach request including a first subscription identity (FSI) to the network apparatus, receive an authentication request including a random number and an authentication token from the network apparatus as a response to the first attach request. Further, the CPU is configured to authenticate the authentication token using the random number and a first key associated with the FSI, obtain a second key and a second subscription identity (SSI) in response to authentication of the authentication token failing, where SSI is obtained from the authentication request. The CPU is further configured to send an authentication failure to the network apparatus. The second key and SSI are stored in the memory device such that the second key is associated with SSI.

7 Claims, 4 Drawing Sheets

(56) References Cited

U.S. PATENT DOCUMENTS

| | | | |
|---|---|---|---|
| 8,528,065 B2* | 9/2013 | Ramos Robles et al. | 726/8 |
| 2003/0229783 A1* | 12/2003 | Hardt | 713/155 |
| 2005/0221764 A1 | 10/2005 | Shen et al. | |
| 2006/0154646 A1* | 7/2006 | Tung | 455/411 |
| 2006/0183500 A1* | 8/2006 | Choi | 455/558 |
| 2007/0086591 A1* | 4/2007 | Blom et al. | 380/279 |
| 2007/0091843 A1* | 4/2007 | Patel et al. | 370/331 |
| 2008/0016230 A1* | 1/2008 | Holtmanns et al. | 709/229 |
| 2008/0232308 A1 | 9/2008 | Dehner et al. | |
| 2009/0061820 A1* | 3/2009 | Patel et al. | 455/411 |
| 2009/0191918 A1 | 7/2009 | Mardiks | |
| 2009/0328144 A1* | 12/2009 | Sherlock et al. | 726/2 |
| 2010/0306839 A1* | 12/2010 | Tie | H04L 9/3213 726/9 |
| 2011/0237199 A1 | 9/2011 | Venkataraman et al. | |
| 2011/0281517 A1* | 11/2011 | Ukkadam | 455/3.06 |
| 2012/0144189 A1* | 6/2012 | Zhong | H04L 63/0853 713/155 |
| 2013/0227660 A1* | 8/2013 | Murakami et al. | 726/5 |

FOREIGN PATENT DOCUMENTS

| | | |
|---|---|---|
| WO | 9856201 A2 | 12/1998 |
| WO | 2012012561 A1 | 1/2012 |

OTHER PUBLICATIONS

3rd Generation Parntership Project, 3rd Generation Partnership Project; Technical Specification Group Services and System Aspects; Feasibility study on the security aspects of remote provisioning and change of subscription for Machine to Machine (M2M) equipment, Technical Report, 3GPP TR 33.812 V9.2.0, Jun. 1, 2010, pp. 1-87, 3GPP, France.

* cited by examiner

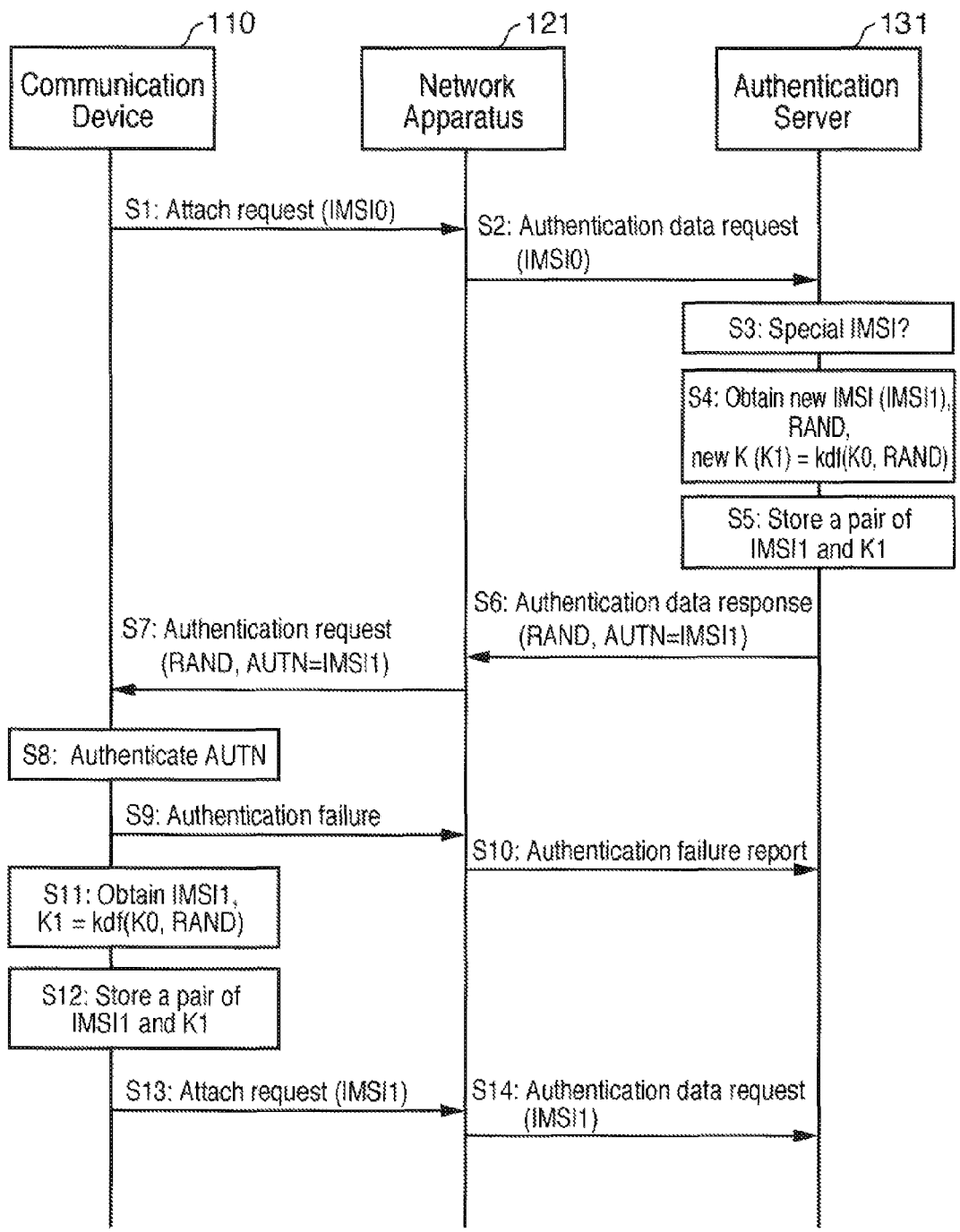

AUTHENTICATION SERVER AND COMMUNICATION DEVICE

TECHNICAL FIELD

The present invention generally relates to an authentication server and a communication device.

BACKGROUND

In the field of the remote subscription management such as MCIM (Machine Communication Identity Module) defined in 3GPP TR 33.812, a registration operator (RO) provides 3GPP connectivity for communication devices to request downloading and provisioning of MCIM credentials from provisioning servers. Each communication device is pre-allocated (pre-installed) a unique subscription identity such as IMSI (International Mobile Subscriber Identity) and a Corresponding credential such as a secret key (hereinafter also referred to as "key" or "K") and uses the subscription identity and key to attach to the RO. To pre-allocate a unique pair of IMSI/K to each communication device for initial connectivity has the following drawbacks. First, it takes cost that the RO delivers unique pairs of IMSI/K to device manufactures and the device manufactures configure the unique pairs of IMSI/K to their communication devices. Second, some of the pre-allocated IMSI may not be used when the communication device supports radio access technology other than 3GPP network access technology. This leads to waste IMSI numbering space.

A solution to overcome the above drawbacks is to pre-allocate the single same pair of IMSI/K to a plurality of communication devices. However, this solution also has drawbacks. Because the RO cannot handle a plurality of attachment requests with the same IMSI at the same time, it is required to carefully manage when and which communication devices can use the common IMSI to attach to the RO for the MCIM provisioning. This is, however, obviously cumbersome and costly because careful scheduling is needed and careful modification of the schedule needs to be performed when another communication device is added with the common IMSI.

SUMMARY

The present invention is intended to address the above-described problem, and it is a feature thereof to introduce a technology for allocating a unique subscription identity to a communication device having a common subscription identity.

According to an aspect of the present invention, there is provided an authentication server. The server includes a receiving unit configured to receive an authentication data request from a network apparatus. The authentication data request includes a subscription identity. The server further includes a determination unit configured to determine whether the received subscription identity is a predetermined subscription identity and an obtaining unit configured to obtain, when it is determined that the received subscription identity is the predetermined subscription identity, a key and a subscription identity other than the received subscription identity. The key is derived by applying a key derivation function to a random number and a key associated with the predetermined subscription identity. The server further includes a storage unit configured to store the obtained key and the obtained subscription identity such that the obtained key is associated with the obtained subscription identity and a response unit configured to send an authentication data response including the random number and an authentication token to the network apparatus. The authentication token includes the obtained subscription identity.

According to another aspect of the present invention, there is provided a communication device. The device includes a sending unit configured to send an attach request to a network apparatus. The attach request includes a subscription identity. The device further includes a receiving unit configured to receive an authentication request from the network apparatus as a response of the attach request. The authentication request includes a random number and an authentication token. The device further includes an obtaining unit configured to obtain a key and a subscription identity. The subscription identity is obtained from the received authentication request and the key is derived by applying a key derivation function to the received random number and a key associated with the sent subscription identity. The device further includes a storage unit configured to store the obtained key and the obtained subscription identity such that the obtained key is associated with the obtained subscription identity and a response unit configured to send an authentication failure to the network apparatus.

Further features of the present invention will become apparent from the following description of exemplary embodiments with reference to the attached drawings, in which like reference characters designate the same or similar parts throughout the figures thereof.

BRIEF DESCRIPTION OF DRAWINGS

FIG. 4 illustrates exemplary operations of the system in FIG. 1 according to some embodiments of the present invention

DETAILED DESCRIPTION

Embodiments of the present invention will now be described with reference to the attached drawings. Each embodiment described below will be helpful in understanding a variety of concepts from the generic to the more specific. It should be noted that the technical scope of the present invention is defined by claims, and is not limited by each embodiment described below. In addition, not all combinations of the features described in the embodiments are always indispensable for the present invention.

Figure 1:
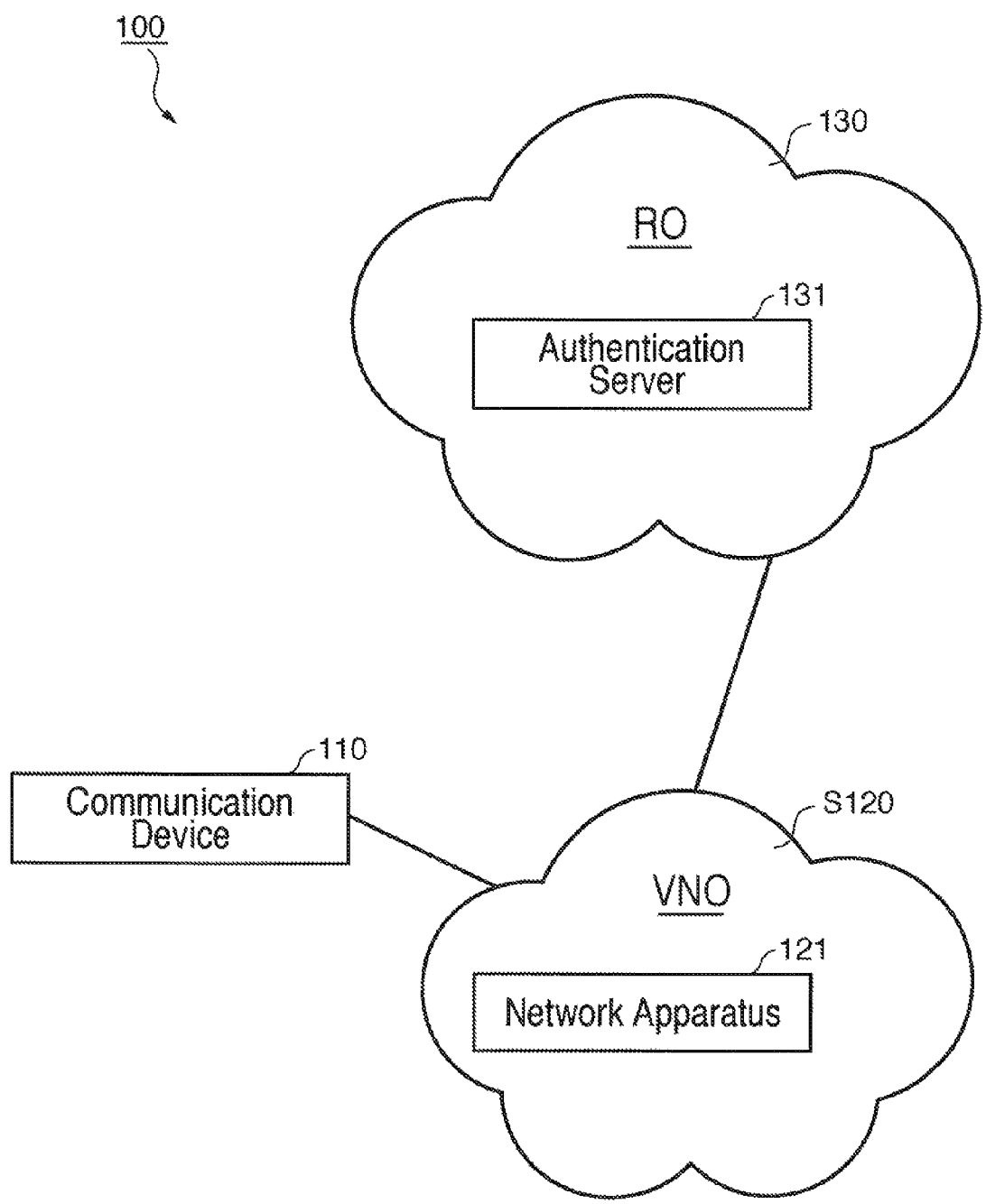
FIG. 1 illustrates an exemplary overall system 100 according to some embodiments of the present invention.

FIG. 1 illustrates an exemplary overall system 100 according to some embodiments of the present invention. The system 100 may include a communication device 110 and networks 120 and 130. The system 100 may include more than one communication device and the communication device 110 represents any one of the communication devices included in the system 100. The following description uses an IMSI and secret key as a subscription identity and credential. However, the present invention can apply to any type of subscription identities and credentials which are used in attachment procedures.

The network 120 is a network managed by a visited network operator (VNO) and includes a network apparatus 121.

The network 120 may be also referred to as a VNO network 120. The network apparatus 121 provides temporary 3GPP network access to the communication device 110. The network apparatus 121 may provide full or restricted connectivity during initial access. The network apparatus 121 may be implemented in a Visitor Location Register (VLR) or a Serving GPRS Support Node (SGSN) of the VNO network 120.

The network, 130 is a network managed by a registration operator (RO) and includes an authentication server 131. The network 130 may be also referred to as an RO network 130. The authentication server 131 provides initial connectivity to the communication device 110 and provides registration and Provisioning functions for the communication device 110. The authentication sever 131 may be implemented in a. Home Location Register (HLR) of the RO network 130.

The communication device 110 is a device which can attach to the RO network 130 by use of a pair of IMSI/K. Examples of the communication device 110 include a mobile phone, a personal computer, a navigation device in a vehicle, a security camera, and so on.

The system 100 may include a network (not shown) managed by a selected home operator (SHO) which is a network operator with capability of providing network connectivity to the communication device 110, as described in 3GFP TR 33.812.

Figure 2:
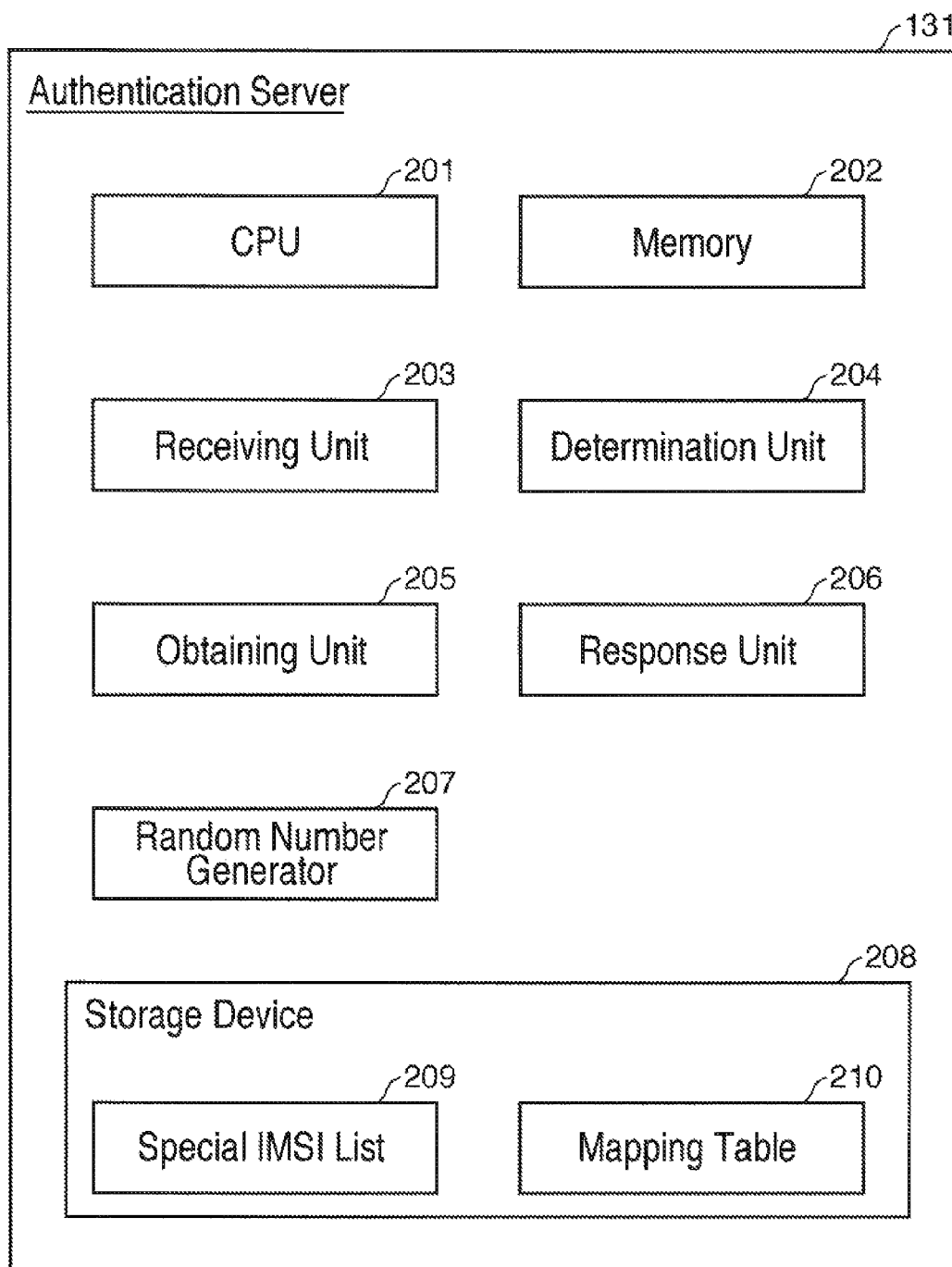
FIG. 2 illustrates an exemplary block diagram of the authentication server according to some embodiments of the present invention.

FIG. 2 illustrates an exemplary block diagram of the authentication server 131. The authentication server 131 may comprise a CPU 201, a memory 202, a receiving unit 203, a determination unit 204, an obtaining unit 205, a response unit 206, a random number generator 207, and a storage device 208.

The CPU 201 controls overall operations of the authentication server 131. The memory 202 stores computer programs and data used in operations of the authentication server 131. The random number generator 207 generates random numbers. The storage device 208 is typically implemented by a nonvolatile storage device such as a hard disk drive and stores a special IMSI list 209 and a mapping table 210. Functions of the receiving unit 203, the determination unit 204, the obtaining unit 205, and the response unit 206 will be described in detail later with reference to FIG. 4. These functions may be implemented in form of computer programs to be executed by the CPU 201.

The special IMSI list 209 stores special IMSIs. As used herein, the special IMSI means an IMSI which is shared among a plurality of communication devices. On the other hand, as used herein, a normal IMSI means an IMSI which is uniquely allocated to a communication device and used in authentication procedure (that is, AKA procedure) or attachment procedure between a communication device and the authentication server 131. The authentication server 131 regards an IMSI included in the special IMSI list 209 as a special IMSI and an IMSI not included in the special IMSI list 209 as a normal IMSI. The RO may add to the special IMSI list 209 an IMSI which was provided to, for example, device manufactures so as to be shared among communication devices of the manufactures. The mapping table 210 stores pairs of IMSI and key. In the mapping table 210, each IMSI is associated with a corresponding key. The mapping table 210 includes entries for special IMSIs and normal IMSIs.

Figure 3:
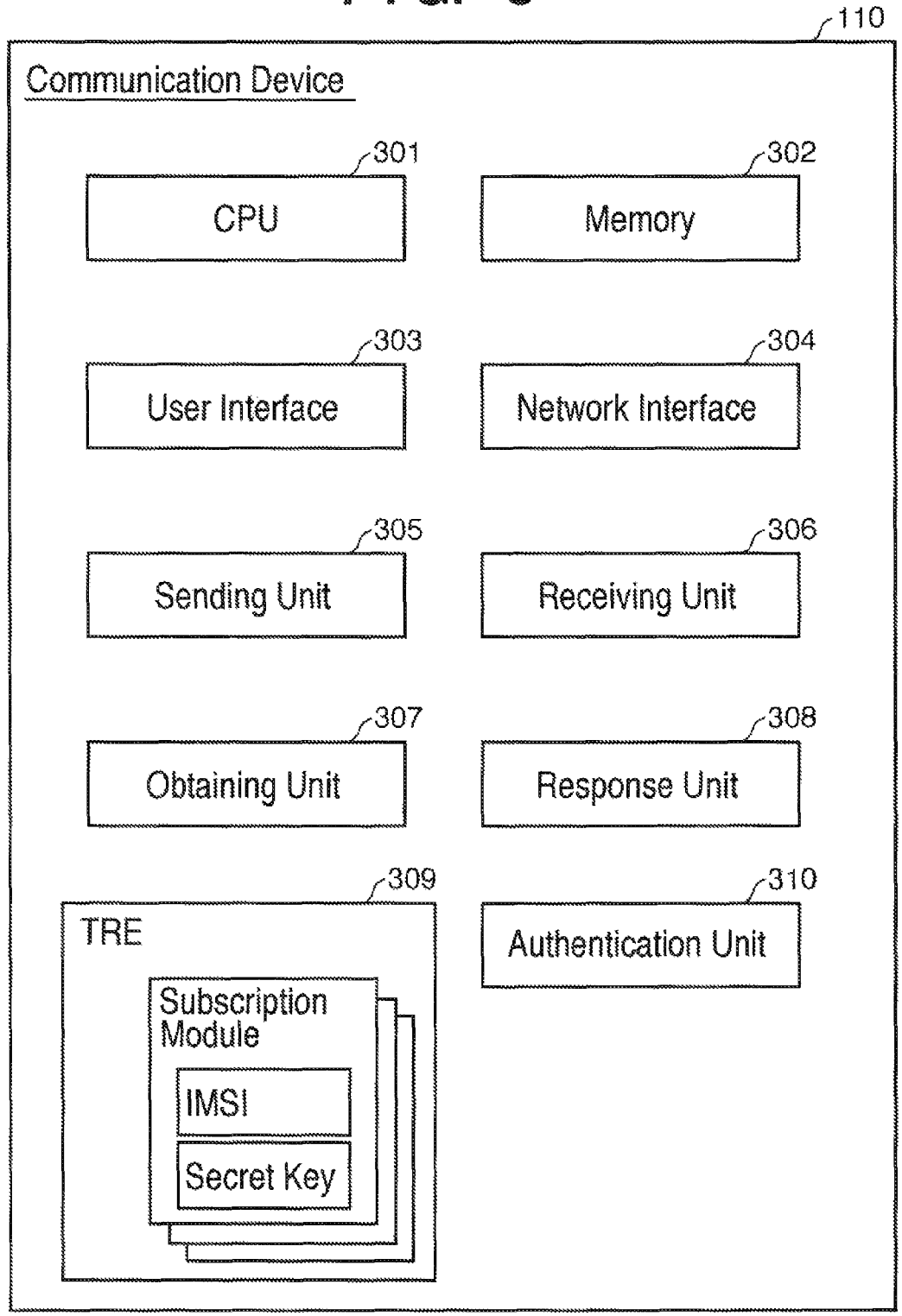
FIG. 3 illustrate an exemplary block diagram of the communication device according to some embodiments of the present invention.

FIG. 3 illustrates an exemplary block diagram of the communication device 110. The communication device 110 may comprise a CPU 301, a memory 302, a use interface 303, a network interface 304, a sending unit 305, a receiving unit 306, an obtaining unit 307, a response unit 308, a trusted environment (TRE) 309, and an authentication unit 310.

The CPU 301 controls overall operations of the communication device 110. The memory 302 stores computer programs and data used in operations of the communication device 110. The user interface 303 provides an interface with a human such as the user of the communication device 110 and includes a display, a keypad, a speaker, and the like, for example. The network interface 304 provides an interface with other devices such as the network apparatus 121, the authentication server 131, and the likes. Functions of the sending unit 305, the receiving unit 306, the obtaining unit 307, the response unit 308, and an authentication unit 310 will be described in detail later with reference to FIG. 4. These functions may be implemented in form of computer programs to be executed by the CPU 301.

The TRE 309 provides some hardware and software protection and separation for the provisioning, storage, execution, and management of subscription modules. The TRE 309 may have a pre-installed subscription module. In some embodiments of the present invention, the TRE 309 stores a special IMSI (hereinafter referred to as "IMSI0") and a corresponding key (hereinafter referred to as "K0"). IMSI0 and K0 may be pre-installed during the manufacture of the communication device 110. Alternatively, IMSI0 and K0 may be included in a memory card which a user of the communication device 110 inserts to the communication device 110. Generally speaking, IMSI0 and K0 may be stored in the communication device 110 in a secure way.

FIG. 4 illustrates exemplary operations of the system 100 according to some embodiments of the present invention. The CPUs included in the communication device 110, a network apparatus 121, and the authentication server 131 may execute computer programs stored in their memories to process these operations. It is assumed that both of the Communication device 110 and the authentication server 131 stores a special IMSI (IMSI0) and a corresponding key (K0) before the following operations are performed.

In step S1, the sending unit 305 of the communication device 110 sends an attach request to the network apparatus 121 in order to obtain a normal IMSI (that is, a unique IMSI). The attach request to be sent includes IMSI0. The network apparatus 121 receives this attach request. Although this attach request includes a special IMSI, this attach request can take the same format as an attach request used in a normal attachment procedure so that the network apparatus 121 can handle this attach request in the same way as the normal attachment procedure. As used herein, the normal attachment procedure means an attachment procedure using a normal IMSI, such as defined in 3GPP TS 33.102 for example.

In step S2, the network apparatus 121 sends an authentication data request to the authentication server 131 in order to obtain a random number (hereinafter referred to as "RAND") and an authentication token (hereinafter referred to as "AUTN"). The authentication data request to be sent includes IMSI0 extracted from the received attach request. The receiving unit 203 of the authentication server 131 receives this authentication data request. This authentication data request can take the same format as an authentication data request used in the normal attachment procedure.

In step S3, the determination unit 204 of the authentication server 131 determines whether an IMSI extracted from the received authentication data request (that is, IMSI0) is a special IMSI or a normal IMSI, for example by determining whether the extracted IMSI is included in the special IMSI list 209. When it is determined that the extracted IMSI is a normal IMSI, the authentication server 131 performs the normal attachment procedure. Details for the normal attachment procedure are omitted because it is well known to those skilled in the art.

When it is determined that the extracted IMSI is a special IMSI, the procedure goes to step S4. In step S4, the obtaining unit 205 of the authentication server 131 obtains a new normal (unique) IMSI (hereinafter referred to as "IMSI1") and a new corresponding key (hereinafter referred to as "K1"). The obtaining unit 205 may obtain IMSI1 by generating a new unique IMSI or by requesting another server to generate a new unique IMSI. The obtaining unit 205 may obtain K1 by applying a key derivation function (KDF) to a RAND and the key (that is, K0) associated with IMSI0. That is K1 is derived from the equation K1=KDF(K0, RAND). Any type of standard key derivation functions may be used of the KDF in step S4. The obtaining unit 205 may obtain the RAND using the random number generator 207. The obtaining unit 205 may obtain the key associated with IMSI0 by referring to the mapping table 210.

In step S5, the obtaining unit 205 stores the obtained IMSI1 and K1 in the mapping table 210 such that K1 is associated with the IMSI1 for future use.

In step S6, the response unit 308 of the authentication server 131 sends an authentication data response to the network apparatus 121 in order to respond to the authentication data request received in step S2. The authentication data response to be sent includes the RAND obtained in step S4 and an AUTN including the IMSI obtained in step S4 (that is, IMSI1). The network apparatus 121 receives this authentication data response. An example of AUTN encoding, an IMSI consists of 15 digits, which are smaller than 60 bits, and an AUTN is 128 bits. Therefore, an AUTN can carry all bits of an IMSI. The AUTN may include the IMSI in the first 60 bits and the remaining bits of the AUTN may be filled with 1 for example. The AUTN may include IMSI1 in the last 60 bits instead of the first 60 bits. Generally speaking, the AUTN may be derived by applying any suitable function to IMSI1 such that the communication device 110 can obtain IMSI1 by applying a reverse function to the AUTN.

This authentication data response can take the same format as an authentication data response used in a normal attachment procedure. According to the normal attachment procedure, an authentication data response also includes a ciphering key (CK), an integrity key (IK), and an expected response (XRES). In order to comply with the format of the authentication data response used in the normal attachment procedure, the response unit 308 fills CK, IK, and XRES in the authentication data response to be sent in step S6 with arbitrary values.

In step S7, the network apparatus 121 sends an authentication request to the communication device 110 in order to authenticate the communication device 110. The authentication data request to be sent includes the RAND and AUTN extracted from the received authentication data response. The receiving unit 306 of the communication device 110 receives this authentication request.

In step S8, the authentication unit 210 may authenticate the AUTN included in the received authentication request, using the RAND included in this request and K0. This authentication will fail because the AUTN was not generated according to the normal attachment procedure. This step may be skipped because the sending unit 305 sent the attach request including a special IMSI in step S1 and thus the authentication unit 210 can forecast that the authentication will fail. In some embodiment, the procedure goes to step S9 after it is determined that the authentication in step S8 fails.

In step S9, the response unit 308 of the communication device 110 sends an authentication failure message to the network apparatus 121 to inform that authentication of the AUTN fails. As described above, the authentication of the AUTN may or may not be actually performed. Failure code in the authentication failure message may be "MAC failure" or "GSM authentication unacceptable" described in 3GPP TS 24.008. The network apparatus 121 receives this authentication failure message.

In step S10, the network apparatus 121 sends an authentication failure report to the authentication server 131 to inform that the authentication of the AUTN fails in the communication device 110. The authentication server 131 may confirm that IMSI1 has been successfully delivered to the communication device 110 based on receiving of the authentication failure report.

In step S11, the obtaining unit 307 of the communication device 110 obtains IMSI1 and a key. The obtaining unit 307 may obtain IMSI1 by extracting IMSI1 from the AUTN which was received in step S7. The obtaining unit 307 may apply to the ATUN the inverse function of the function which was used in step S6 in order to obtain the AUTN from IMSI1. In this case, the reverse function may be stored in the communication device 110 (for example, in the TRE 309) before the procedure shown in FIG. 4 begins. In some embodiments, the reverse function may be allocated to the communication device 110 when IMSI0 and K0 are allocated to the communication device 110.

The obtaining unit 307 may obtain a key by applying the KDF to the RAND included in the authentication request in step S7 and K0 stored in the TRE 309, that is, by calculating KDF(K0, RAND). The KDF used in step S11 is the same function as the KDF used in step S4. Thus, the obtained key is equal to K1 because the arguments applied to the KDF are the same in steps S4 and S11. The KDF may be stored in the communication device 110 (for example, in the TRE 309) before the procedure shown in FIG. 4 begins. In some embodiments, the KDF may be allocated to the communication device 110 when IMSI0 and K0 are allocated to the communication device 110.

In step S12, the obtaining unit 307 stores IMSI1 and K1 in the TRE 309 such that K1 is associated with IMSI1 for future use.

After step S12, the communication device 110 can use a unique IMSI (that is IMSI1) and a corresponding key (that is K1) which the authentication server 131 also stores. The communication device 110 therefore can perform the normal attachment procedure using IMSI1 and K1. In one embodiment, in step S13, the Sending unit 305 of the communication device 110 sends another attach request including IMSI1 to the network apparatus 121 to attach to the RO network 130. In step S14, the network apparatus 121 sends to an authentication data request including IMSI1 to the authentication server 131. The remaining operations will be understood by those skilled in the art and their descriptions omitted.

In another embodiment, the network apparatus 121 may send an identity request to the communication device 110 after receiving the authentication failure message in step S9. The communication device 110 sends an identity response including IMSI1. Descriptions of the remaining operations are omitted because they are specified in the 3GPP TS24.008.

In order to reduce a risk of DoS (Denial of Service) attack for a special IMSI, the authentication server 131 may set rate limit for authentication data requests from the network apparatus 121, shorter valid period for allocated IMSI1, or the like.

According to the embodiments of the present invention, a single same pair of subscription identity and secret key is shared among a plurality of communication devices and a unique pair of subscription identity and secret key is allocated to a communication device on demand. This avoids wasting a numbering space of subscription identities. Moreover, the cost to coordinate for collision avoidance in terms of initial connectivity establishment can be removed.

The communication device and the authentication server can share a secret key associated with the delivered subscription identity in a secure way because this secret key is not communicated via networks.

During the procedure for delivering a unique subscription identity, the network apparatus relaying communication between the communication device and the authentication server can handle messages in the same way as in the normal attachment procedure. Thus, the present invention is applicable to the scenario where the communication device is located in a visited network, without changing configuration of the network apparatus such as a VLR and SGSN.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication device in communication with an authentication server via a network apparatus, the communication device comprising:
a central processing unit configured to:
send a first attach request to the network apparatus, wherein the first attach request includes a first subscription identity;
receive an authentication request from the network apparatus as a response to the first attach request, the authentication request including a random number and an authentication token;
authenticate the authentication token using the random number and a first key associated with the first subscription identity;
obtain a second key and a second subscription identity in response to authentication of the authentication token failing, wherein the second subscription identity is obtained from the authentication request and the second key is derived by applying a key derivation function to the random number of the authentication request and a first key associated with the first subscription identity; and
send an authentication failure to the network apparatus; and
a memory device configured to store the second key and the second subscription identity such that the second key is associated with the second subscription identity.

2. The communication device of claim 1,
wherein the central processing unit is further configured to send a further attach request to the network apparatus after sending the authentication failure, wherein the further attach request includes the second subscription identity.

3. A system comprising:
an authentication server configured to:
receive an authentication data request from a network apparatus, wherein the authentication data request includes a first subscription identity;
determine whether the first subscription identity is a predetermined subscription identity;
obtain, in response to it being determined that the first subscription identity is the predetermined subscription identity, a second key and a second subscription identity other than the first subscription identity, wherein the second key is derived by applying a key derivation function to a random number and a first key associated with the predetermined subscription identity; and
generate an authentication data response including the random number and an authentication token, the authentication token including the second subscription identity; and
a communication device having the first subscription identity and the first key associated with the first subscriber identity, the communication device being enabled by the authentication server via the network apparatus for obtaining the second key and the second subscription identity, wherein the communication device is configured to:
receive the authentication token and the random number from the authentication server via the network apparatus;
authenticate the authentication token using the random number and the first key associated with the first subscription identity; and
obtain the second key and the second subscription identity in response to authentication of the authentication token failing.

4. The system of claim 3, wherein the authentication server is configured to store the second key and the second subscription identity in a storage device such that the second key is associated with the second subscription identity.

5. The system of claim 3, wherein the communication device is configured to store the second key and the second subscription identity in a memory device such that the second key is associated with the second subscription identity.

6. The system of claim 3, wherein the second subscription identity is a unique subscription identity.

7. The system of claim 3, wherein the communication device is further configured to send an attach request to the network apparatus after sending the authentication failure, wherein the attach request includes the second subscription identity.

* * * * *